United States Patent [19]

Loth

[11] Patent Number: 4,730,288

[45] Date of Patent: Mar. 8, 1988

[54] EXTERIOR ELEMENT FOR A WRIST WATCH

[75] Inventor: Eric Loth, Bienne, Switzerland

[73] Assignee: Montres Rado S.A., Lengnau, Switzerland

[21] Appl. No.: 4,788

[22] Filed: Jan. 8, 1987

Related U.S. Application Data

[63] Continuation of Ser. No. 752,682, Jul. 8, 1985, abandoned.

[30] Foreign Application Priority Data

Jul. 12, 1984 [CH] Switzerland ........................ 3382/84

[51] Int. Cl.⁴ ........................ G04B 37/00; B23P 13/00

[52] U.S. Cl. ........................ 368/280; 29/179; 428/543

[58] Field of Search ........................ 29/160.6, 179

[56] References Cited

U.S. PATENT DOCUMENTS

| | | | |
|---|---|---|---|
| 3,841,848 | 10/1974 | Kasai et al. | 368/280 |
| 3,861,990 | 1/1975 | Kasai et al. | 368/280 |
| 4,495,254 | 1/1985 | Hoffman | 368/280 |

FOREIGN PATENT DOCUMENTS

| | | | |
|---|---|---|---|
| 2339858 | 2/1974 | Fed. Rep. of Germany . | |
| 2178032 | 9/1973 | France | 368/280 |
| 58-80586 | 5/1983 | Japan | 368/280 |
| 572237 | 12/1975 | Switzerland | 368/280 |
| 1414864 | 11/1975 | United Kingdom . | |

*Primary Examiner*—Vit W. Miska

*Attorney, Agent, or Firm*—Sughrue, Mion, Zinn, Macpeak and Seas

[57] ABSTRACT

An exterior element for a wrist watch such as a case or bracelet at least partially formed from a composite material. Such material comprises an organic binder such as an acetal homopolymer and macroscopic particles of mineral substances which arrive flush with at least a portion of the visible surface of the element and cover the major part of said portion.

8 Claims, No Drawings

EXTERIOR ELEMENT FOR A WRIST WATCH

This is a continuation application of pending prior application Ser. No. 752,682 filed on July 8, 1985, (now abandoned).

This invention concerns an exterior element for a wrist-watch such as a case or a bracelet of which at least a part is made from composite material.

BACKGROUND OF THE INVENTION

Composite materials formed from a matrix of plastic material charged with microscopic particles such as glass fibers are already employed for the manufacture of elements of watch cases, in particular monolithic cases and case bands. Such elements are manufactured by injection which gives the advantage of greatly reducing the costs of manufacture. Plastic materials enable the realization of watch cases which are light and of various colours.

These two factors have been determinative in the success encountered by such products. At the same time this success is limited exclusively to the lowest price watches. This is essentially due to the fact that the very low hardness of the plastic renders it vulnerable to the numerous attacks to which most wrist watch cases are daily subjected owing to the various activities professional or leisure practised by the wearers of such watches.

It has already been proposed to obtain cases by the sintering of hard materials such as carbides or nitrides. At the same time, the production of such cases is limited to a higher price category of watches because of the cost of manufacture thereof.

It has also been proposed to obtain the exterior parts of the watch by use of natural materials such as mineral or rock materials or even sea shells. Such a type of manufacture is described in the French patent document FR Pat. No. 2,178,032 and in the corresponding U.S. Pat. No. 3,861,990. In both of these documents the pieces are obtained by sintering and do not in any case concern a composite material in the sense of the term used herein. In the French document however the next to last paragraph of the description states that although one has described only a single hot sintering procedure following compression, one may obtain results similar thereto by means of a binder in a procedure where an adhesive is employed or injection moulding in combination with plastic materials. This statement however is not supported by any example which would set forth at least one manufacturing method proposing a composite material where the mineral particles occupy 60 to 95% of the said material as is the case in the present invention. In effect at the filing date of the cited documents there was known only a mixture of fibers or glass beads with the plastic material in a proportion not exceeding 25%. Moreover, the same document foresees only the utilization of powder thus of microscopic particles which can lead to easily scratchable visible surfaces.

For a watch case, the mechanical properties required are in fact critical only at the surface and especially on the exposed surfaces subject to attacks due to shocks and scratches. The inclusion of microscopic particles has as effect the modification of the elastic properties of the plastic, above all vis-à-vis the stresses such as shear, compression, tension, bending etc. On the other hand, such charges have a less pronounced effect vis-à-vis the surface hardness because of their microscopic dimensions. In effect a cutting element can scratch the surface of such a reinforced plastic by passing between the particles in view of their dimension. It appears thus that an effective scratch protection of the surface of a part in plastic material does not depend alone on the hardness of the particles used as reinforcement and of the proportion of such particles. Moreover, a too high proportion of microscopic particles may have as a consequence the rendering of the resin less resistant to shocks which is evidently undesirable for a watch case which includes in particular edges capable of being broken off if the material of the case is brittle.

The purpose of this invention is to overcome at least partially the difficulties mentioned hereinabove.

SUMMARY OF THE INVENTION

To this effect at least a portion of the exterior element is manufactured from a composite material which comprises an organic binder and macroscopic particles of mineral substances enrobed in said binder. Such particles arrive flush with at least a portion of the visible surface of the element and cover 60% to 95% of such portion.

Such an element presents the advantage of having an excellent protection against scratches and shocks in its thus constituted surface because of the macroscopic dimension of the inclusions and their sufficient density at the same time without rendering the composite material excessively brittle. It is thus possible by means of a process of injection moulding to realize a watch case or a bracelet presenting inalterable properties neighbouring those of cases or bracelets coated with sintered carbides or nitrides. Moreover, elements realized according to the invention present a new aesthetic aspect, especially following polishing of the surface which brings out the colours of the inclusions which may be different from that of the plastic. In effect, the inclusions of nitrides, oxides, carbides, etc. may present very different colours. It is thus that one may imagine a diversity of interesting colour combinations such as a black plastic with yellow TiN or a lighter plastic with sapphire inclusions. One may also provide a mixture of inclusions of different colours. Following polishing, the surface then takes on a marble aspect pleasant to the eye and unusual, the surface integrity being effectively protected by the inclusion of the mineral substances.

DESCRIPTION OF THE PREFERRED EMBODIMENT

Hereinafter will be described some examples of realization of exterior elements such as watch cases or bracelets according to this invention.

Almost any mineral material may be associated with the resin, in particular carbides, borides, nitrides, carbonitrides, oxides, etc., but likewise sintered agglomerates such as TiC bound with Ni, elements of a monocrystalline network such as α-$Al_2O_3$ (corundum) or amorphous structures such as glass, particles of stellite or hard steel of the same type employed for sintering.

On the other hand, the choice of the resin is relatively limited. Preferably, there will be chosen as resin a technical plastic, especially an acetal homopolymer such as that sold by Du Pont under the commercial name "Delrin" (trademark registered), of the type 100 ST, which has the advantage of presenting an Izod shock resistance (with notch) of 900 J/m, i.e. 7 to 30 times greater than that of the other types of "Delrin" which constitute one of the best ranges of technical plastics. This material may be moulded by hot injection. Other materials such as polyamide 12 or polycarbonate may also be employed.

Three methods of manufacture of the exterior elements of the watch according to the invention will be set forth.

According to one of these methods, there is placed in the mould cavity for the desired element such as the case band, the back, bezel, combined case band-back or the bracelet a charge of mineral particles which may comprise a mixture of the various substances mentioned hereinabove, but likewise may include one only of these substances according to the decorative effect which is desired. The diameter of the particles may likewise be chosen to be either uniform or as varied as possible. The diameter of the smallest of these particles is on the order 0.1 mm across; it may however extend to several millimeters. When the particles are of different colours one may for instance choose the diameter as a function of the colour. The quantity of particles per unit of volume may be variable but generally is determined so that on the visible surface of the element and particularly for the parts most exposed to wear, there is a proportion as great as possible of mineral inclusions. Thereafter, the mould is closed and the resin is injected under pressure. The element thus realized then presents a mosaic structure formed of hard particles and of resin which maintains the latter bound to one another. These particles occupy the major part of the volume. Following cooling and removal from the mould, the surfaces of the moulded element which comprise the visible portions are advantageously polished by means of a diamond grinder in order to bring the inclusion particles perfectly flush with the surface of the resin. This latter has in effect a tendency to shrink during cooling. The grinding likewise permits bringing out the different colours of the particles which are flush with the surface of the element, it being noted that, to improve anchoring in the resin, such particles are preferably employed in the rough state. They may advantageously be obtained from manufacturing scrap but might also be specially produced.

According to another method of manufacture of the element, the charge of mineral material in the form of particles of a diameter greater or equal to 0.1 mm may be incorporated in the resin before its injection in the mould. This technique however gives rise to the problem of abrasion when the resin charged with particles is displaced in the injection tubes.

Finally, a third technique consists of providing mineral particles only on the surface and particularly on the visible surfaces. To this effect the resin is injection moulded without charging the particles. Thereafter, the particles are added as desired to the chosen surfaces, in particular the visible surfaces by heating the particles to a temperature sufficient to soften locally the resin and permit their penetration. This technique offers in particular the advantage of enabling control of the particle arrangement as a function of their diameter and colours so as to provide special protection of certain portions of the surface, in particular the edges, as well as creating decorative motifs which are not left to chance as in the previously described variants.

It is further to be noted that to obtain an exterior element of a hardness comparable with that of hard materials, the proportion covered by hard particles of the surface which is visible and consequently exposed to attacks of any nature must be greater than half. Advantageously, it will be comprised between 60 and 95%, and preferably around 85%. Moreover, the hardness of the particles generally will be chosen to be $\geqq$1400 HV. Certain particles may be of transparent substances as a function of the desired aesthetic.

It is finally to be noted that whatever be the method of manufacture chosen it is important that the organic binder and the macroscopic particles possess a very high wetting capacity to assure maximum fluidity of the binder and perfect anchoring of the particles. Procedures are known in which one adds special substances to the organic binder in order to give it wetting capability. As far as the particles are concerned, they may be rendered wettable by vigorous cleaning which will remove all grease or other impurities. It will also be noted that this treatment prevents the accidental formation of bubbles which could give rise to fissures. There will be further understood the advantage of this treatment in the case where the binder is a glue assuring adhesion between particles.

As far as the bracelet is concerned, at least two variants are to be envisaged.

There may thus be formed either a succession of links connected by hinges or a succession of thickened zones bearing the particles and thinned down zones permitting bending.

What I claim is:

1. An exterior element for a wrist watch, said element being at least partially formed from a composite material, said material comprising an organic binder and macroscopic particles of mineral substances enrobed in said binder and disposed flush with at least a portion of a visible surface of said element, and covering 60%–95% of said portion, wherein said particles have a diameter greater than or equal to 0.1 mm.

2. An exterior element as set forth in claim 1 wherein said particles are distributed throughout the entire mass of the binder.

3. An exterior element as set forth in claim 1 wherein said particles are limited in distribution to the region of said portion.

4. An exterior element as set forth in claim 1 wherein said binder comprises an acetal homopolymer.

5. An exterior element as set forth in claim 1 wherein the flush parts of the particles present surfaces resulting from polishing said portion.

6. An exterior element as set forth in claim 1 wherein said particles are of substances having various colours.

7. An exterior element as set forth in claim 1, wherein said element comprising a watch case.

8. An exterior element as set forth in claim 1, wherein said element comprises a watch bracelet.

* * * * *